(12) United States Patent
Cohen et al.

(10) Patent No.: US 11,887,154 B2
(45) Date of Patent: *Jan. 30, 2024

(54) MODEL FOR SERVING EXPLORATION TRAFFIC

(71) Applicant: Yahoo Ad Tech LLC, Wilmington, DE (US)

(72) Inventors: Tal Cohen, Netanya (IL); Yair Koren, Haifa (IL); Abraham Shahar, Tel Aviv (IL); Alexander Zlotnik, Haifa (IL); Yohay Kaplan, Tel-Aviv (IL)

(73) Assignee: Yahoo Ad Tech LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,925

(22) Filed: Oct. 18, 2022

(65) Prior Publication Data

US 2023/0039956 A1 Feb. 9, 2023

Related U.S. Application Data

(63) Continuation of application No. 16/897,609, filed on Jun. 10, 2020, now Pat. No. 11,481,800.

(51) Int. Cl.
*G06Q 30/02* (2023.01)
*G06Q 30/0242* (2023.01)
*G06N 20/00* (2019.01)
*G06Q 30/0273* (2023.01)
(Continued)

(52) U.S. Cl.
CPC ........... *G06Q 30/0246* (2013.01); *G06N 5/04* (2013.01); *G06N 20/00* (2019.01); *G06Q 10/06375* (2013.01); *G06Q 30/0244* (2013.01); *G06Q 30/0275* (2013.01)

(58) Field of Classification Search
CPC ......... G06Q 30/0246; G06Q 10/06375; G06Q 30/0244; G06Q 30/0275; G06N 20/00
See application file for complete search history.

(56) References Cited

U.S. PATENT DOCUMENTS 10,304,081 B1 * 5/2019 Boshy ................ G06Q 30/0254
10,362,129 B2 * 7/2019 Yan ....................... H04L 67/535
(Continued)

OTHER PUBLICATIONS

Digital_content_recommender_on_the_Internet, Ha, IEEE, 2006, pp. 70-77.*
(Continued)

*Primary Examiner* — Michael I Ezewoko
(74) *Attorney, Agent, or Firm* — Cooper Legal Group LLC (57) ABSTRACT

One or more computing devices, systems, and/or methods for implementing a model for serving exploration traffic are provided. An amount of spend by a content provider to provide content items of the content provider through a content serving platform to client devices of users is determined. A number of exploration impressions of users viewing exploration content items of the content provider over a timespan is determined. A return on exploration impression metric is determined for the content provider based upon a ratio of the amount of spend to the number of exploration impressions. The return on exploration metric is used to rank available exploration content items of content providers for serving exploration traffic.

20 Claims, 7 Drawing Sheets

(51) Int. Cl.
*G06N 5/04* (2023.01)
*G06Q 10/0637* (2023.01)

(56) References Cited

U.S. PATENT DOCUMENTS

2019/0080348 A1* 3/2019 Shah ................. G06Q 30/0277
2020/0242657 A1* 7/2020 Blacker ............. G06Q 30/0276

OTHER PUBLICATIONS

Display Advertising, Wang, ArXiv, 2017, pp. 1-11.*
Internet Advertising, Yuan, ArXiv, 2012, Sections 1-7.*
Recommendation Systems for Tourism Based on Social Networks, Menk, ArXiv, 2019, pp. 1-23.*
Towards_building_a_scholarly_big_data_platform, Wu, IEEE, 2014, Sections 1-10.*

* cited by examiner

MODEL FOR SERVING EXPLORATION TRAFFIC

RELATED APPLICATION

This application claims priority to and is a continuation of U.S. application Ser. No. 16/897,609, filed on Jun. 10, 2020, entitled "MODEL FOR SERVING EXPLORATION TRAFFIC", which is incorporated by reference herein in its entirety.

BACKGROUND

A content serving platform may be configured to provide content items to client devices for display to users, such as display through a mobile application, a website, or other user interface. For example, the content serving platform may provide articles, images, links to content, videos, audio messages, recommendations, and/or a variety of other content items to the client devices. In an example, a user on a mobile device may access an email application. The email application may determine that two content items can be displayed within an email user interface through which emails of the user are displayed. The email application may transmit a request over a network from the mobile device to a computing device, such as a server, hosting the content serving platform. The content serving platform may utilize a user engagement model to rank content items based upon bid values that content providers will pay if content items are engaged with by users (e.g., a user clicks a content item, the user purchases a service or item described by a content item, etc.) and predicted likelihoods that users will engage with the content item, which may be based upon content item attributes of content items and user attributes of user. In this way, the two highest ranked content items may be selected and transmitted over the network to the mobile device for display through the email user interface.

SUMMARY

In accordance with the present disclosure, one or more computing devices and/or methods for implementing a model for serving exploration traffic are provided. A content serving platform is configured to provide content items to client devices for display to users. A plurality of content providers may submit bids through the content serving platform to bid on opportunities to display content items to users. For example, an opportunity may correspond to a website requesting a content item from the content serving platform to display to a user visiting the website. The content serving platform may rank available content items based upon bid values of bids submitted by content providers of the available content items and based upon predictions by a user engagement model of predicted likelihoods of the user engaging with each of the available content items. The content serving platform may maintain the content items as being available for serving non-exploration traffic (e.g., maintained within a non-exploration bucket), which is used by the user engagement model as a repository of available content items to serve for non-exploration traffic based upon bid values and predicted likelihoods of user engagement (e.g., 90% of requests for content items may be deemed as non-exploration traffic, and thus are directed to the non-exploration bucket). The content items are served for non-exploration traffic in a deterministic manner using the user engagement model to rank content items and select one or more highest ranked content items to serve.

When content items become newly available to the content serving platform, those content items are treated as exploration content items because the user engagement model has not yet been trained to accurately determine the target audience of users for the content items. Thus, the user engagement model is unable to create accurate predicted likelihoods of user engagement for the exploration content items. In an example, the exploration content items are maintained within an exploration bucket that is separate from the non-exploration bucket. The exploration content items within the exploration bucket are served for exploration traffic (e.g., 10% of requests for content items may be deemed as exploration traffic, and thus are directed to the exploration bucket). User engagement with the exploration content items (e.g., whether a user clicked a content item, whether the user purchased an item based upon viewing a content item, whether the user scrolled past and ignore a content item, etc.) may be tracked and used to train the user engagement model to predict likelihoods of user engagement with the exploration content items. Once sufficiently trained or a threshold number of impressions have occurred for an exploration content item, the exploration content item may be moved from the exploration bucket to the non-exploration bucket as a content item that can be served for non-exploration traffic using the user engagement model. Other various conditions may trigger the exploration item being moved from the exploration bucket to the non-exploration bucket.

Because exploration content items are served in a non-deterministic manner without the benefit of the user engagement model (e.g., randomly selected and served), little benefit may be gained from serving exploration traffic with exploration content items other than for training the user engagement model to understand an audience of users that would be interested in a particular exploration content item (e.g., most users may not engage with the exploration content items). Thus, exploration traffic may be "expensive." Furthermore, certain content providers may exploit the content serving platform by obtaining more than their fair share of exploration content item impressions (e.g., exploration content items being viewed by users). This can occur when a content provider defines and submits a large number of exploration content items to the content serving platform and/or by making multiple accounts. This is because exploration content items are served in a non-deterministic manner, and thus a content provider with more exploration content items will receive a greater probability of their exploration content items being selected to serve exploration traffic.

Accordingly, as provided herein, exploration content items are ranked using return on exploration impression metrics for serving exploration traffic. The return on exploration impression metrics may also be used to assign percentages of exploration traffic to content providers (e.g., 5% of exploration traffic may be served using content items of a first content provider, 12% of exploration traffic may be served using content items of a second content provider, etc.). A return on exploration impression metric for a content provider is derived from an amount of spend of the content provider over a timespan (e.g., an amount spent by the content provider with the content serving platform for serving content items of the content provider for non-exploration traffic) and a number of exploration impressions previously provided for the content provider over the timespan (e.g., an amount of views of exploration content items over a timespan, such as a number of times a content item is served for exploration traffic over the timespan). That is, an amount of spend over a timespan by a content provider to provide content items of the content provider through the content serving platform to client devices of users is determined (e.g., a total amount of bid values paid by the content provider to the content serving platform). The amount of spend may correspond to spend associated with content items of the content provider within the non-exploration bucket and/or may correspond to a total spend of a content provider for all traffic, such as exploration and non-exploration traffic. The number of exploration impressions of users viewing exploration content items of the content provider over the timespan is determined. A return on exploration impression metric for the content provider is determined based upon the amount of spend divided by the number of exploration impressions. The return on exploration impression metric may be used to rank exploration content items to serve for exploration traffic (e.g., a highest ranked exploration content item may be provided to a client device in response to a request from the client device for a content item to display to a user).

In an embodiment, a percentage of exploration traffic is assigned to the content provider based upon the return on exploration impression metric calculated for the content provider. In an example, the percentage of exploration traffic is allocated directly based upon the return on exploration impression metric (e.g., the return on exploration impression metric for the content provider is divided by a sum of return on exploration impression metrics of all content providers). In an example, the percentage of exploration traffic is allocated by applying a function to the return on exploration impression metric (e.g., a ranking of return to exploration impression metric and allocating i/n percentage to advertiser i). In an example, the percentage of exploration traffic is allocated by adjusting a current percentage (e.g., from a previous iteration of identifying return on exploration impression metrics; an adjustment based upon a comparison to an average return on exploration metric of all content providers, which is not limited to a comparison to a previous metric of a same content provider; etc.) by a relatively small amount towards a new return on exploration impression metric (e.g., increasing the previous allocation percentage if the current return on exploration impression metric is larger than the previous return on exploration impression metric and decreasing the previous allocation percentage if the current return on exploration impression metric is smaller than the previous return on exploration impression metric).

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
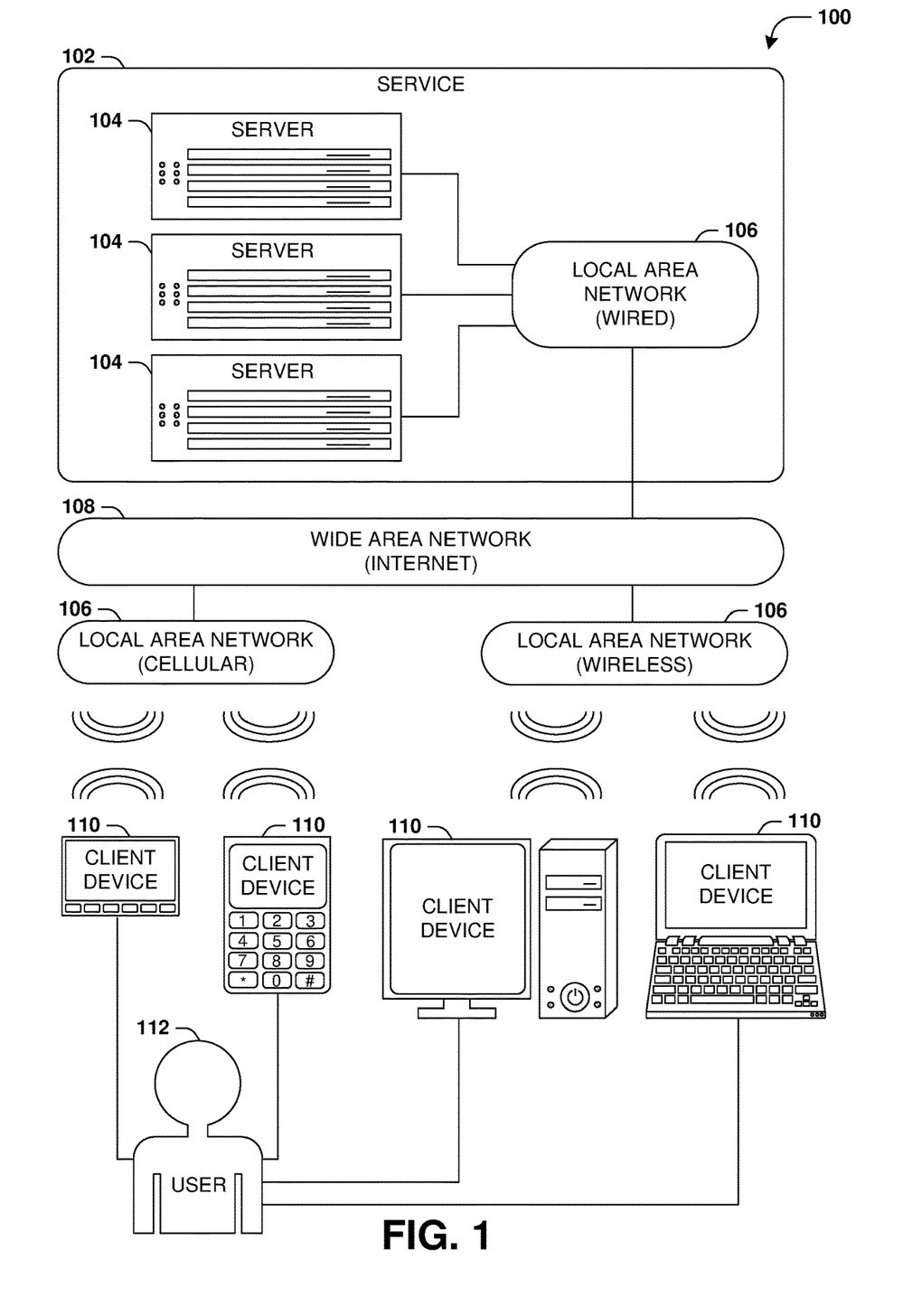
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-topeer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
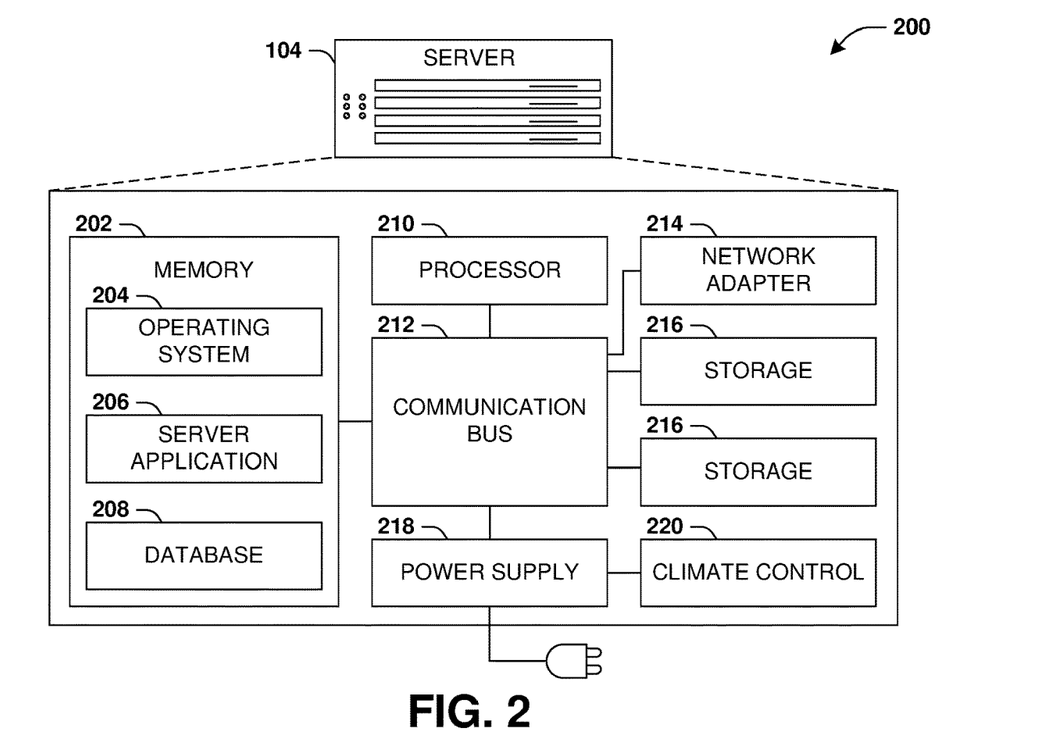
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
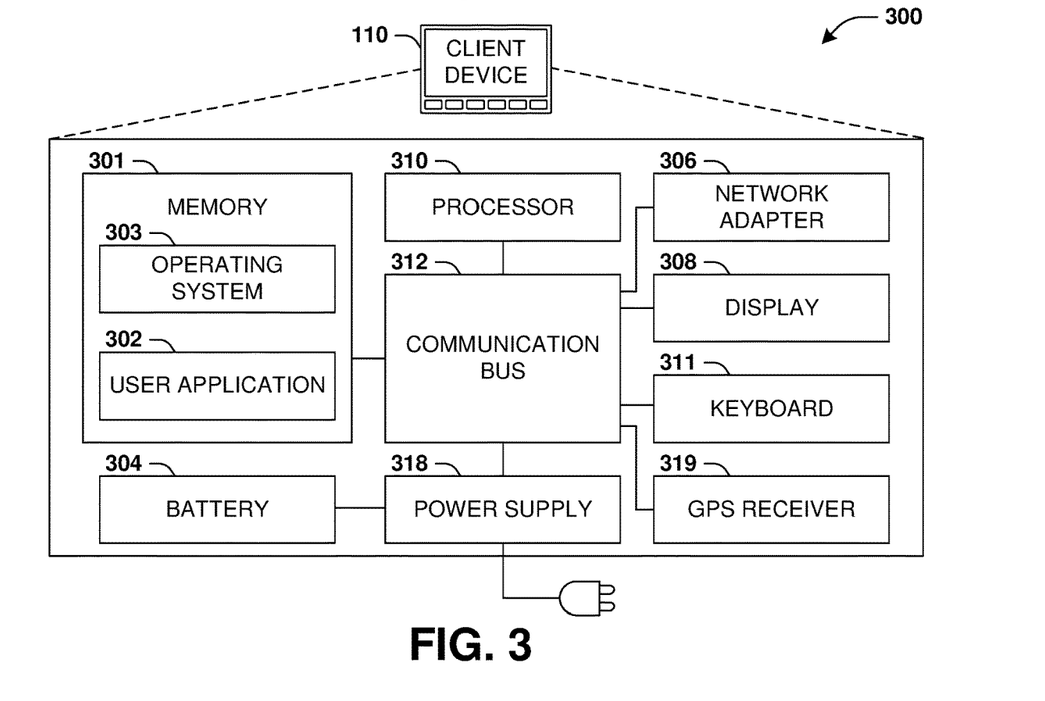
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

2. Presented Techniques

One or more systems and/or techniques for implementing a model for serving exploration traffic are provided. A content serving platform may spend a substantial amount of storage resources, computing resources, and network bandwidth to store, select, and provide content items to client devices over a network. Thus, the accuracy of selecting and transmitting certain content items over the network to client devices of particular users that may have an interest in such content items is important so that storage resources, computing resources, and network bandwidth is not wasted by otherwise providing content items to users that may ignore the content items because the content items are irrelevant to those users. To improve the accuracy of selecting content items that will be engaging and relevant to users, the content serving platform may utilize a user engagement model for ranking content items to provide to users through a bidding process.

In an example of the bidding process, content providers may submit bids to the content serving platform to bid on an opportunity to provide a content item to a client device (e.g., to display an image, a video, a message, text, a link to a website, an article, a recommendation, or other content item through a user interface, a mobile application, a website, etc.). A bid by a content provider will have a bid value corresponding to an amount the content provider will pay if the user engages with a content item of the content provider in a certain manner (e.g., viewing the content item, clicking the content item, purchasing an item or performing an action after viewing the content item such as creating an account or signing up to a newsletter, etc.). The user engagement model has been trained to output predicted likelihoods that particular users will engage with certain content items based upon content item attributes of the content items and user attributes of users (e.g., a 23 year old may be more interested in a videogame article than a 70 year old grandma). In this way, content items are ranked based upon their bid values and predicted likelihoods of user engagement so that content items are served in a deterministic manner in order to more accurately provide content items to users that will engage with those content items. In this way, computing resources and network bandwidth is efficiently utilized and not wasted.

Unfortunately, the user engagement model will lack an understanding about what audience of users will find content items, newly introduced to the content serving platform, interesting and engaging. Accordingly, these newly introduced content items (e.g., content items on which the user engagement model has not been adequately trained to output accurate predicted likelihoods of user engagement) are treated as exploration content items. Because the exploration content items are provided to users in a non-deterministic manner without the benefit of the user engagement model, the probability of user engaged is very low (e.g., content items may be randomly selected to provide to client devices of users, whom may ultimate have little interest in such content items). Thus, exploration content items are "costly" because a substantial amount of storage, processing resources, and network bandwidth can be wasted in provided the exploration content items to client devices of users that will end up ignoring the exploration content items. Once enough training data of users engaging or not engaging with an exploration content item has been gathered and used to train the user engagement model to more accurately predict likelihoods of users interacting with the exploration content item, the exploration content item is treated as a normal content item that is able to utilize the user engagement model for the bidding process.

Not only are exploration content items "costly," some content providers may attempt to exploit the exploration performed by the content serving platform. Because exploration content items are non-deterministically selected (e.g., randomly selected) from an exploration bucket of available exploration content items currently under exploration, a content provider could define and submit an inordinately large number of exploration content items to the content serving platform. The more exploration content items that the content provider has within the exploration bucket, the greater the chance an exploration content item of the content provider will be selected and provided to a user. Thus, the content provider is exploiting the content serving platform in order to obtain an unfair share of impressions (e.g., user views) through exploration traffic. Even if a particular content provider account is limited to having a certain number of simultaneous exploration content item actively available through the exploration bucket for serving exploration traffic, the content provider may circumvent this by creating multiple accounts. Thus, there is a need to more efficiently and fairly serve exploration traffic with exploration content items in a manner that does not waste storage resources, computing resources, and network bandwidth. It may be appreciated that the exploration bucket may comprise any data structure, list, designations, or identifiers used to designate certain content items as being exploration content items available for serving exploration traffic.

Accordingly, as provided herein, exploration traffic is served in a more efficient and fair manner to mitigate exploitation. This is achieved by selectively serving exploration traffic with exploration content items of content providers based upon ranks assigned to the exploration content items using return on exploration impression metrics and/or by selectively serving the exploration traffic based upon percentages of exploration traffic allocated for the content providers by an exploration model. In particular, an amount of spend by a content provider with the content serving platform to provide content items to users is taken into account when determining a return on exploration impression metric for the content provider and/or when determining how much exploration traffic to allocate to exploration content items of the content provider. For example, some content providers may spend a substantial amount more than other content providers for having the content serving platform provide their content items to users. Thus, the spend of content providers is taken into account because content providers that typically spend more overall with the content serving platform should be allocated more exploration traffic than content providers that do not spend much with the content serving platform. This helps to not reward those content providers that do not ultimately spend much on having the content serving platform provide content items to users. This also helps mitigate instances of exploitation of the content serving platform where a content provider merely defines a large number of new content items, which may be used by the content serving platform as exploration content items (e.g., because the new content items are new to the content serving platform), which can result in exploitation of exploration traffic by the content provider without actually spending much overall.

The number of exploration impressions of users viewing exploration content items of the content provider is also taken into account when determining the return on exploration impression metric for the content provider and/or when determining how much exploration traffic to allocate to exploration content items of the content provider. The number of exploration impressions is taken into account so that a content provider is not obtaining an unfair share of exploration traffic compared to other content providers. An exploration impression may correspond to a user viewing an exploration content item that was served for exploration traffic (e.g., 1% of requests for content items may be designated as exploration traffic that is to be served with exploration content items, while 99% of requests are designated as non-exploration traffic that is to be served with content items using a user engagement model).

The amount of spend by the content provider over a timespan (e.g., a day, an hour, etc.) and the number of exploration impressions of users viewing exploration content items of the content provider over the timespan is used to determine a return on exploration impression (ROEI) metric for the content provider. For example, the return on exploration impression metric is determined based upon the amount of spend by the content provider outside of exploration divided by the number of exploration impressions of users viewing exploration content items of the content provider. The return on exploration impression metric corresponds to an exploration efficiency of providing the content provider with exploration traffic. The more the content provider spends with the content serving platform and/or the less exploration impressions consumed by the content provider, the larger the return on exploration impression metric (e.g., users that spend more without having to consume a lot of "costly" exploration traffic are efficiently utilizing exploration traffic). Thus, exploration content items of that content provider will be ranked relatively higher because of the larger return on exploration impression metric assigned to the content provider. The less the content provider spends with the content serving platform and/or the more exploration impressions consumed by the content provider, the smaller the return on exploration impression metric (e.g., users that spend less and consume a substantial amount of "costly" exploration traffic are inefficiently utilizing exploration traffic and/or exploiting exploration by the content serving platform). Thus, exploration content items of that content provider will be ranked relatively lower because of the smaller return on exploration impression metric assigned to the content provider.

Return on exploration impression metrics are determined, for content providers that utilize the content serving platform, based upon spend by the content providers and exploration impressions consumed by the content providers during a timespan. The return on exploration impression metrics are used to rank exploration content items for serving exploration traffic. For example, an exploration content item of a content provider with a relatively higher return on exploration impression metric may be ranked higher than an exploration content item of a content provider with a relatively lower return on exploration impression metric. In this way, one or more exploration content items may be selected (e.g., a highest ranked exploration content item) to serve a request associated with the exploration traffic (e.g., a request from a client device for a content item).

In an example, percentages of exploration traffic are allocated to each content provider based upon their return on exploration impression metrics. In an example, a content provider with a larger return on exploration impression metric, indicating that the content provider is efficiently utilizing exploration traffic, is provided with a larger percentage of exploration traffic. A content provider with a smaller return on exploration impression metric, indicating that the content provider is inefficiently utilizing exploration traffic (e.g., wasting computing resources, storage resources, and network bandwidth of the content serving platform to exploit the content serving platform to provide exploration content items to users), is provided with a smaller percentage of exploration traffic.

The exploration model is generated and/or trained to use the percentages of exploration traffic assigned to content providers for serving exploration content items for exploration traffic. That is, the exploration model is used to select exploration content items to serve exploration traffic (e.g., servicing exploration traffic may correspond to transmitting an exploration content item to a client device in response to a request from the client device for one or more content items) so that exploration content items of content providers are served according to the percentages of exploration traffic assigned to the content providers (e.g., 5% of exploration traffic is served with content items of a content provider assigned a 5% percent of exploration traffic). It may be appreciated that serving traffic (e.g., exploration traffic and non-exploration traffic) may relate to selecting content item(s) or exploration content item(s) to provide to a client device in response to a request from the client device for content item(s) to display to a user. The exploration model is periodically updated/recomputed (e.g., hourly, daily, weekly, etc.) with current spend of content providers and current numbers of exploration impressions. In this way, exploration traffic is efficiently served in a dynamic manner in order to avoid exploitation and inefficient resource utilization of computing devices.

Figure 4:
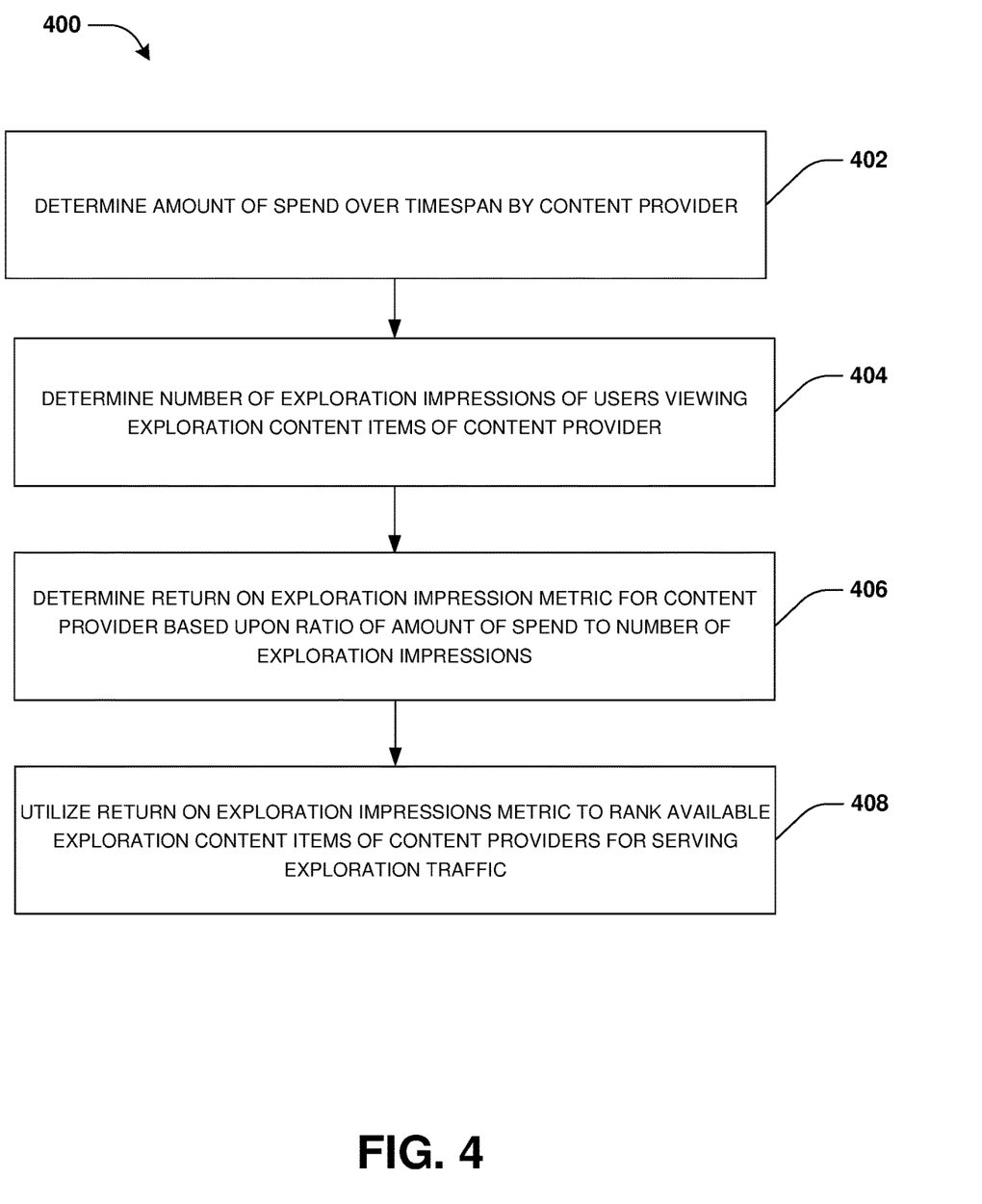
FIG. 4 is a flow chart illustrating an example method for implementing a model for serving exploration traffic.
Figure 5A:
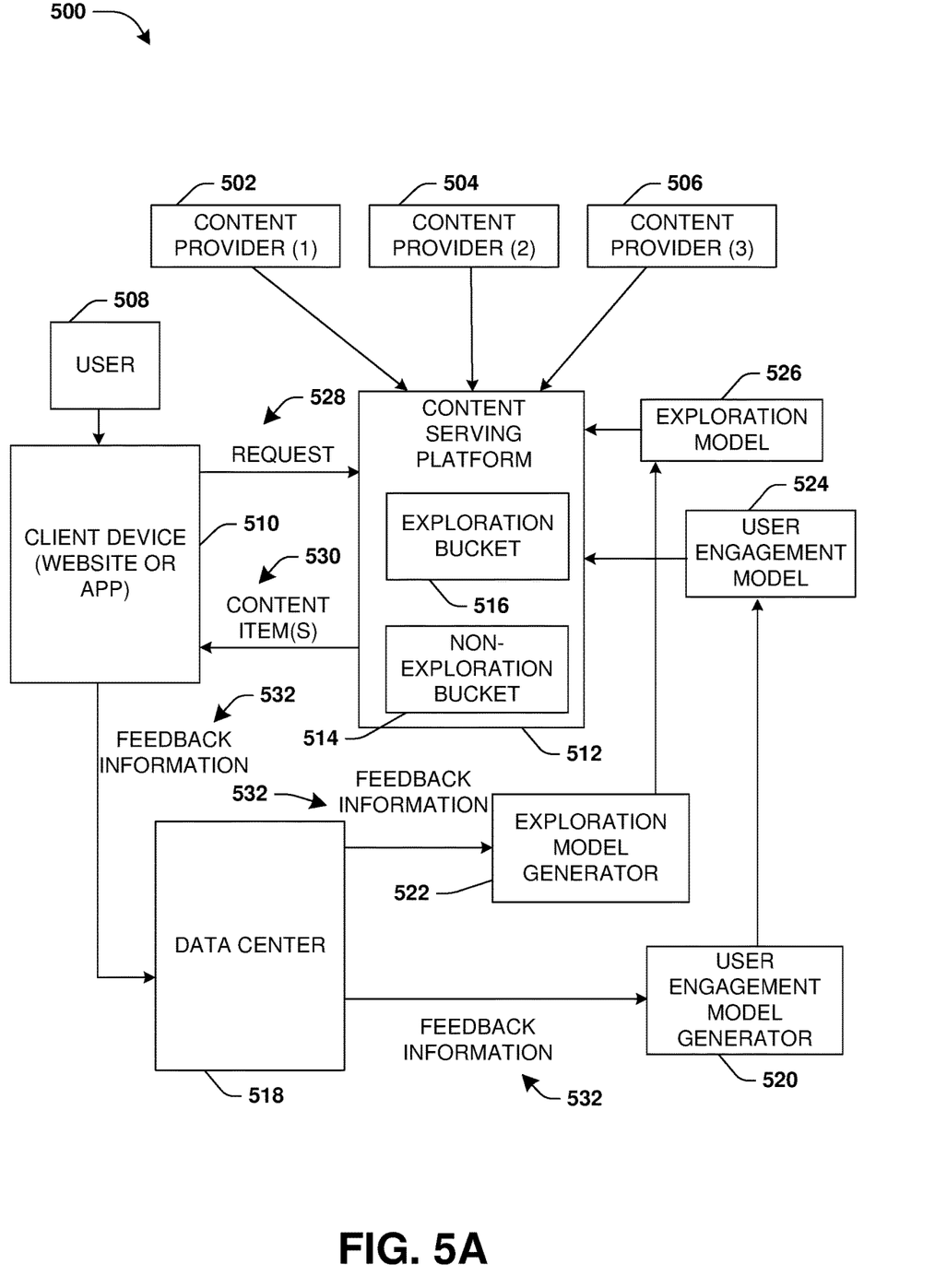
FIG. 5A is a component block diagram illustrating an example system for implementing a model for serving exploration traffic.
Figure 5B:
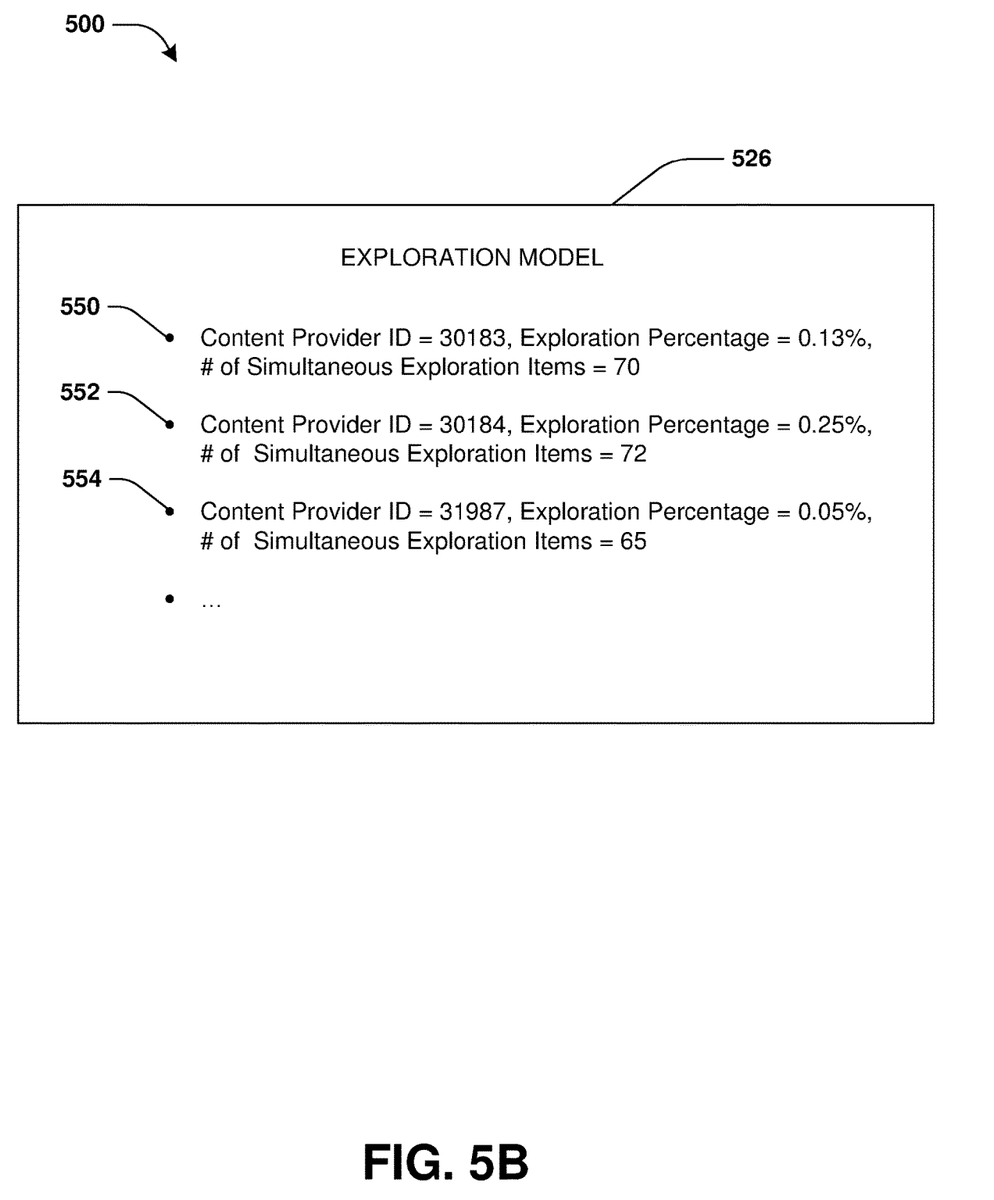
FIG. 5B is a component block diagram illustrating an example system for implementing a model for serving exploration traffic, where an exploration model is populated with entries for content providers.
Figure 5C:
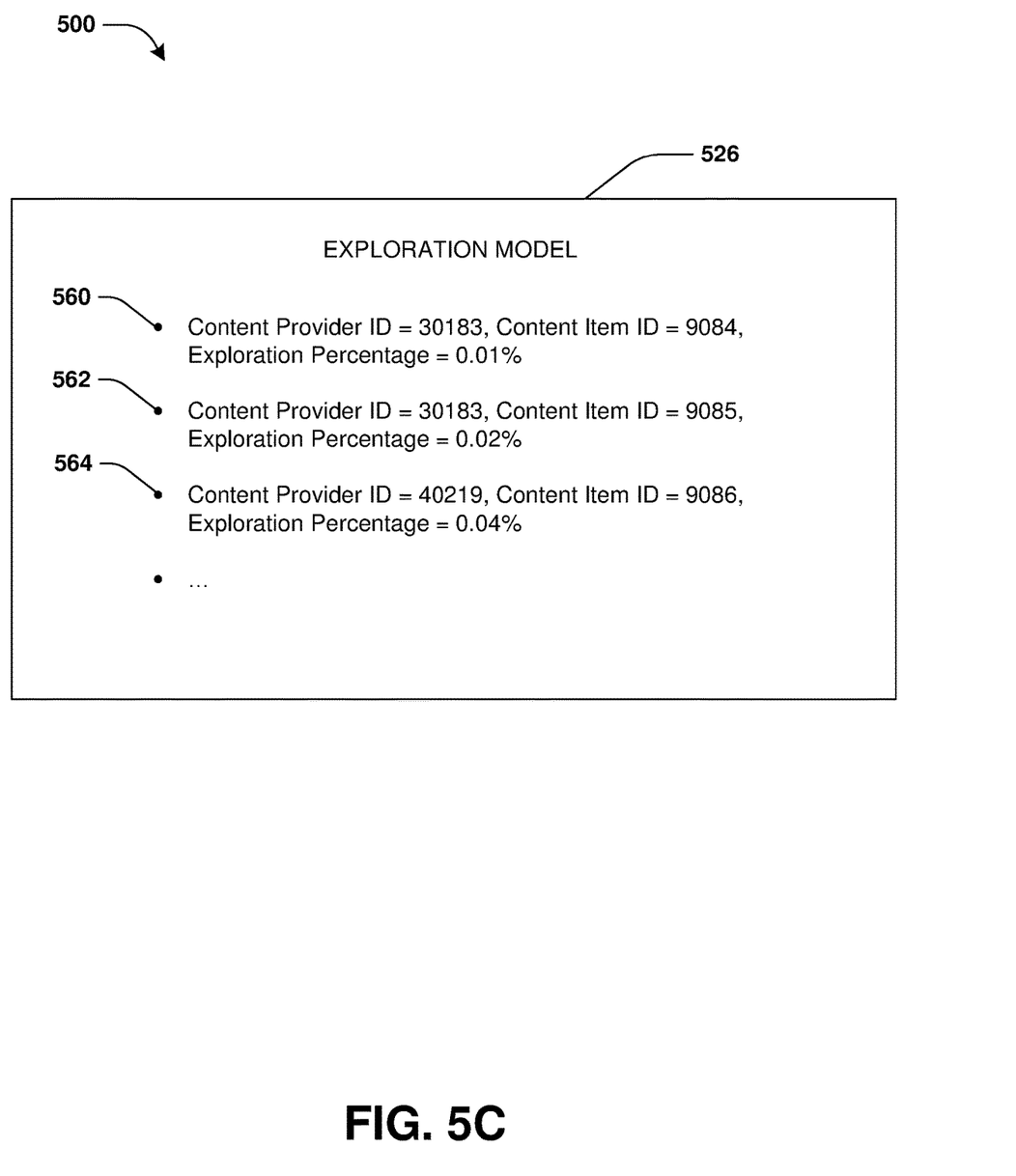
FIG. 5C is a component block diagram illustrating an example system for implementing a model for serving exploration traffic, where an exploration model is populated with entries for content items.

An embodiment of implementing a model for serving exploration traffic in an efficient manner is illustrated by an example method 400 of FIG. 4, and is described in conjunction with FIGS. 5A-5C. A content serving platform 512 may be hosted by one or more computing devices, such as a server, a virtual machine, etc. Content providers, such as a first content provider 502, a second content provider 504, a third content provider 506, and/or any other number of content providers, may connect to the content serving platform 512 over a network. The content serving platform 512 may host a bidding process through which content providers may submit bids of what the content providers will pay for user engagement (e.g., viewing a content item, clicking a content item, or performing an action after viewing a content item such as purchasing an item, purchasing a service, signing up for a newsletter, etc.) with content items of the content providers (e.g., the first content provider 502 may specify a bid value of $0.45 that the first content provider 502 will pay if a user clicks on content item, such as an image with a link to a website).

The content items of the content providers may comprise articles, images, website links, recommendations, text, coupons, videos, and/or a wide variety of other types of content. In some embodiments, the content serving platform 512 may assign content items into one or more buckets (e.g., a bucket may merely be a designation that a content item is available for serving one or more types of traffic, such as exploration traffic and/or non-exploration traffic), while in other embodiments, content items are not assigned to buckets. For example, content items for which a user engagement model 524 is capable of predicting likelihoods of users engaging with the content items are assigned to a non-exploration bucket 514 for serving non-exploration traffic. The non-exploration bucket 514 may comprise any data structure, list, designation, or identifier used to designate certain content items as being content items available for serving non-exploration traffic. A percentage of traffic (e.g., a percentage of requests from client devices for content item(s)) is allocated to the non-exploration bucket 514, such as 95% of traffic from client devices requesting content items from the content serving platform 512. In another example, content items for which the user engagement model 524 is not capable of accurately predicting likelihoods of users engaging with the content items are assigned to an exploration bucket 516 as exploration content items to explore. The exploration content items are explored by serving the exploration content items for exploration traffic in order to obtain feedback information 532 used to better understand what audiences will and will not engage with the exploration content items. The exploration bucket 516 may comprise any data structure, list, designation, or identifier used to designate certain content items as being exploration content items available for serving exploration traffic.

An exploring process is performed for the exploration content items within the exploration bucket 516 in order to learn what audience will engage with such exploration content items (e.g., user attributes of users that engaged with an exploration content item can be used to understand what types of users will engage with that exploration content item). This information may be used to train the user engagement model 524 so that the exploration content items may no longer we considered exploration content items, but can be moved into the non-exploration bucket 514 as content items served for non-exploration traffic using the user engagement model 524. A percentage of traffic (e.g., a percentage of requests from client devices for content item(s)) is allocated to the exploration bucket 516, such as 5% of traffic from client devices requesting content items from the content serving platform 512.

During real-time operation of the content serving platform 512, traffic from client devices requesting content items is directed to the various buckets maintained by the content serving platform 512, such as 5% of traffic being directed to the exploration bucket 516 and 95% of traffic being directed to the non-exploration bucket 514. The content serving platform 512 may utilize the user engagement model 524 for ranking content items within the non-exploration bucket 514 in order to select one or more content item(s) 530 to serve in response to a request 528 from a client device 510 that is directed to the non-exploration bucket 514, such as to display to a user 508 through a website accessed by the client device 510 or an application being executed by the client device 510.

The user engagement model 524 may be generated and/or trained by a user engagement model generator 520. The user engagement model generator 520 may train the user engagement model 524 to generate predicted likelihoods of users engaged with content items based upon attributes of the users (e.g., age, gender, location, browsing history, user profile data, social network data, purchase history, etc.) and content item attributes of content items (e.g., a topic of a content item, an author of a content item, a type of content item, etc.). A rank of a content item within non-exploration bucket 514 may be determined based upon a predicted likelihood of the user 508 engaging with the content item and a bid value of a bid that a content provider of the content item will pay for user engagement with the content item (e.g., a value paid if the user clicks on the content item, performs an action after viewing the content item, etc.). For example, the rank may be a product of the bid value times the predicted likelihood of user engagement. In this way, available content items are ranked, and one or more content item(s) 530 are transmitted over a network from the content serving platform 512 to the client device 510 for display to the user 508 (e.g., highest ranked content item(s)).

User engagement or lack thereof for a content item provided to the client device 510 and/or other content items provided to other client devices may be tracked as feedback information 532 by a data center 518. The feedback information 532 may indicate whether the user viewed the content item (an impression) or not, whether the user engaged with the content item (e.g., did the user click on the content item or perform an action after viewing the content item), a spend associated with the content item (e.g., was the bid value paid because the user engaged with the content item or did the user not engage with the content item), attributes of the user 508, etc. The data center 518 may provide the feedback information 532 to the user engagement model generator 520 for further training the user engagement model 524.

Exploration content items within the exploration bucket 516 are typically selected to serve exploration traffic in a non-deterministic manner without the benefit of the user engagement model 524 that can otherwise provide relatively accurate predicted likelihoods of users engaging with content items for which the user engagement model 524 has been trained. In an example, when the request 528 for a content item is received from the client device 510, the request 528 may be deemed to be exploration traffic and is assigned to the exploration bucket 516 (e.g., selected to be part of the 5% of overall traffic that is assigned to the exploration bucket 516), an exploration content item may be randomly selected from the exploration bucket 516 and returned to the client device 510 for display to the user.

Unfortunately, this non-deterministic manner can be exploited by content providers and is inefficient. Accordingly, as provided herein, an exploration model 526 is generated by an exploration model generator 522, and is used to more efficiently select exploration content items to provide to client devices for serving exploration traffic in a manner that mitigates exploitation and abuse of the content serving platform 512 by content providers.

In order to generate the exploration model 526, the exploration model generator 522 takes into account spend data of content providers that utilize the content serving platform 512, such as the first content provider 502, the second content provider 504, and/or the third content provider 506. At 402, an amount of spend over a timespan (e.g., an hour, a day, a week, etc.) by the first content provider 502 with the content serving platform 512 to provide content items of the first content provider 502 to client devices of users is determined. In an embodiment, the amount of spend corresponds to bid values paid by the first content provider 502 for content items served from the non-exploration bucket 514 for non-exploration traffic using the user engagement model 524 to serve the content items of the first content provider 502 in a deterministic manner. In this embodiment, the amount of spend does not include spend by the first content provider 502 for exploration content items served from the exploration bucket 516 for exploration traffic. In another embodiment, the amount of spend may additionally correspond to not just spend by the first content provider 502 on content items served for non-exploration traffic but also spend by the first content provider 502 for exploration content items served from the exploration bucket 516 for exploration traffic.

Similarly, the exploration model generator 522 determines an amount of spend by the second content provider 504 over the timespan with the content serving platform 512 to provide content items of the second content provider 504 to client devices of users. The exploration model generator 522 determines an amount of spend by the third content provider 506 over the timespan with the content serving platform 512 to provide content items of the third content provider 506 to client devices of users. In this way, the exploration model generator 522 will take into account the different amounts of spend by content providers when generating the exploration model 526

At 404, a number of exploration impressions of users viewing exploration content items of the first content provider 502 over the timespan is determined. For example, an exploration content item of the first content provider 502 may be provided by the content serving platform from the exploration bucket 516 to the client device 510 for display to the user 508 in a non-deterministic manner (e.g., the exploration content item may be selected from the exploration bucket 516 without using the user engagement model 524). Feedback information 532 regarding whether the user 508 viewed the exploration content item may be tracked by the data center 518. The feedback information 532 may indicate whether the user 508 viewed the exploration content item (an impression) or not. The feedback information 532 may indicate whether there was any engagement by the user 508 (e.g., whether the user clicked on the exploration content item or performed some action after viewing the exploration content item). The feedback information 532 may comprise user attributes of the user 508 (e.g., age, gender, location, occupation, etc.), a spend by the first content provider 502 for the impression or user engagement, etc. The data center 518 may provide this feedback information 532 to the exploration model generator 522. In this way, the exploration model generator 522 may track the number of exploration impressions of users viewing exploration content items of the first content provider 502.

Similarly, the exploration model generator 522 determines a number of exploration impressions of users viewing exploration content items of the second content provider 504 over the timespan. The exploration model generator 522 determines a number of exploration impressions of users viewing exploration content items of the third content provider 506 over the timespan. In this way, the exploration model generator 522 will take into account the different numbers of exploration impressions of users viewing exploration content items of different content providers when generating the exploration model 526.

At 406, a return on exploration impression metric is determined for the first content provider 502 by the exploration model generator 522. The return on exploration impression metric is calculated as a ratio of the amount of spend by the first content provider 502 with the content serving platform 512 to the number exploration impressions obtained by the first content provider 502. For example, the return on exploration impression metric is the amount of spend by the first content provider 502 with the content serving platform 512 over the timespan divided by the number exploration impressions obtained by the first content provider 502 over the timespan.

Similarly, the exploration model generator 522 determines a return on exploration impression metric for the second content provider 504 based upon a ratio of the amount of spend by the second content provider 504 with the content serving platform 512 to the number exploration impressions obtained by the second content provider 504 over the timespan. The exploration model generator 522 determines a return on exploration impression metric for the third content provider 506 based upon a ratio of the amount of spend by the third content provider 506 with the content serving platform 512 to the number exploration impressions obtained by the third content provider 506 over the timespan. In this way, the exploration model generator 522 calculates return on exploration impression metrics for content providers using the content serving platform 512.

The exploration model generator 522 outputs the exploration model 526 that is derived from return on exploration impression metrics calculated for the content providers based upon spend and exploration impressions during the timespan. In an example, the exploration model 526 comprises entries for content providers and/or entries for individual exploration content items. For example, a first entry for the first content provider 502 may comprise a first identifier of the first content provider 502, a return on exploration impression metric for the first content provider 502 (and/or an exploration percentage of exploration traffic to allocate to the first content provider 502 based upon the return on exploration impression metric, such as where 0.61% of exploration traffic is to be served using exploration content items of the first content provider 502), and/or other information. For example, the first entry may comprise a first maximum number of exploration content items of the first content provider 502 that can be available at any given point in time for serving exploration traffic (e.g., a maximum number of exploration content items of the first content provider 502 that can be maintained within the exploration bucket 516 at any given point in time). The first maximum number of exploration content items may be based upon the return on exploration impression metric of the first content provider 502 and a configurable base value (e.g., the first maximum number of exploration content items may be the configurable base value times the percentage of exploration traffic allocated to the first content provider 502). The configurable base value may be determined based upon a minimum percentage metric to ensure at least some minimum amount of exploration traffic is served using exploration content items of content providers so that any given content provider is not starved from being able to have their exploration content item being provided to client devices.

The exploration model 526 may comprise a second entry for the second content provider 504. The second entry may comprise a second identifier of the second content provider 504, a return on exploration impression metric for the second content provider 504 (and/or an exploration percentage of exploration traffic to allocate to the second content provider 504 based upon the return on exploration impression metric, such as where 0.13% of exploration traffic is to be served using exploration content items of the second content provider 504), and/or other information. For example, the second entry may comprise a second maximum number of exploration content items of the second content provider 504 that can be available at any given point in time for serving exploration traffic (e.g., a maximum number of exploration content items of the second content provider 504 that can be maintained within the exploration bucket 516 at any given point in time). The exploration model 526 may comprise a third entry for the third content provider 506. The third entry may comprise a third identifier of the third content provider 506, a return on exploration impression metric for the third content provider 506 (and/or an exploration percentage of exploration traffic to allocate to the third content provider 506 based upon the return on exploration impression metric, such as where 0.42% of exploration traffic is to be served using exploration content items of the third content provider 506), and/or other information. For example, the third entry may comprise a third maximum number of exploration content items of the third content provider 506 that can be available at any given point in time for serving exploration traffic (e.g., a maximum number of exploration content items of the third content provider 506 that can be maintained within the exploration bucket 516 at any given point in time).

The exploration model 526 may comprise entries for particular exploration content items. For example, an entry for an exploration content item of a content provider may comprise an identifier of the content provider, a content item identifier of the content item, and a percentage of exploration traffic to assign to the content item (e.g., 0.01% of exploration traffic should be served using the exploration content item).

At 408, the return on exploration impression metrics of the exploration model 526 are used by the content serving platform 512 to rank exploration content items within the exploration bucket 516 for serving exploration traffic. For example, an exploration content item of a content provider with a relatively higher return on exploration impression metric may be ranked higher than an exploration content item of a content provider with a relatively lower return on exploration impression metric. In this way, one or more exploration content items may be selected (e.g., a highest ranked exploration content item) to serve a request associated with the exploration traffic (e.g., a request from a client device for a content item). In this way, exploration traffic is efficiently and fairly served using exploration content items that are ranked using the exploration model 526.

In an embodiment, percentages of exploration traffic are assigned to the content providers based upon their respective return on exploration impression metrics. The exploration model generator 522 may include the percentages of exploration traffic within the exploration model 526 for use by the content serving platform 512 for selecting and/or ranking exploration content items to serve for exploration traffic directed to the exploration bucket 516. In an example, a percentage of exploration traffic is allocated directly based upon a return on exploration impression metric (e.g., a return on exploration impression metric for a content provider is divided by a sum of return on exploration impression metrics of all content providers). In an example, a percentage of exploration traffic is allocated by applying a function to a return on exploration impression metric (e.g., a ranking of return to exploration impression metric and allocating i/n percentage to advertiser i). In an example, the percentage of exploration traffic is allocated by adjusting a current percentage (e.g., from a previous iteration of identifying return on exploration impression metrics) by a relatively small amount towards a new return on exploration impression metric (e.g., increasing the previous allocation percentage if the current return on exploration impression metric is larger than the previous return on exploration impression metric and decreasing the previous allocation percentage if the current return on exploration impression metric is smaller than the previous return on exploration impression metric).

In an example, a percentage of exploration traffic may be determined and/or adjusted based upon a minimum exploration percentage metric. For example, if the percentage of exploration traffic (e.g., 0.01%) is less than the minimum exploration percentage metric (e.g., 0.03%), then the percentage of exploration traffic is adjusted up to be the minimum exploration percentage metric. Percentages of exploration traffic for other content providers may be adjusted based upon the percentage of exploration traffic being adjusted up to be the minimum exploration percentage metric so that the total percentages of exploration traffic is 100%.

In an embodiment, the exploration model 526 is populated with entries for content providers, such as a first entry 550 for a first content provider, a second entry 552 for a second content provider, a third entry 554 for a third content provider, and/or other entries for other content providers, as illustrated by FIG. 5B. The first entry 550 may comprise an identifier of the first content provider, a percentage of exploration traffic allocated to the first content provider, and a number of simultaneous exploration content items that can be maintained for the first content provider. The second entry 552 may comprise an identifier of the second content provider, a percentage of exploration traffic allocated to the second content provider, and a number of simultaneous exploration content items that can be maintained for the second content provider. The third entry 554 may comprise an identifier of the third content provider, a percentage of exploration traffic allocated to the third content provider, and a number of simultaneous exploration content items that can be maintained for the third content provider.

In an embodiment, the exploration model 526 is populated with entries for specific content items, such as a fourth entry 560 for a first content item, a fifth entry 562 for a second content item, a sixth entry 564 for a third content item, and/or other entries for other content items, as illustrated by FIG. 5C. The fourth entry 560 may comprise an identifier of the first content provider, a content item identifier of the first content item, and a percentage of exploration traffic allocated to the first content item. The fifth entry 562 may comprise an identifier of the first content provider, a content item identifier of the second content item, and a percentage of exploration traffic allocated to the second content item. The sixth entry 564 may comprise an identifier of a fourth content provider, a content item identifier of the third content item, and a percentage of exploration traffic allocated to the third content item.

In an embodiment, the exploration model 526 is populated with both entries for content providers and entries for content items.

User engagement with the exploration content items being served to client devices of users is tracked as the feedback information 532. The feedback information 532 may indicate whether users viewed, clicked, and/or performed actions with respect to the exploration content items. The data center 518 may collect this feedback information 532, and provide the feedback information 532 to the exploration model generator 522. The exploration model generator 522 may periodically (e.g., hourly, daily, weekly, etc.) update/re-compute the exploration model 526 using the user engagement data, spend data, and exploration impression data of the feedback information 532. For example, new return on exploration impression metrics may be calculated for a second timespan (subsequent the timespan for which the return on exploration impression metrics were previously calculated) based upon spend by content providers over the second timespan and numbers of exploration impressions obtained by the content providers during the second timespan. A new exploration model 526 may be generated based upon the new return on exploration impression metrics for the second timespan. The new exploration model 526 may be used to serve future exploration traffic. User engagement with exploration content items served using the new exploration model 526 may be tracked and used yet again to update/re-compute the new exploration model for subsequent use in serving exploration traffic. In this way, the exploration model 526 may be iteratively updated/re-computed based upon recent feedback information.

The feedback information 532 is also used by the user engagement model generator 520 to train the user engagement model 524 to generate predicted likelihoods of users engaging with exploration content items. The user engagement model 524 may output a confidence metric of how confident the user engagement model 524 is at predicting a likelihood of users engaging with an exploration content item. If the confidence metric is above a threshold, then the exploration content item may be removed from the exploration bucket 516 and added to the non-exploration bucket 514 as a content item to serve using the user engagement model 524 for non-exploration traffic. In another example, the exploration content item may be removed from the exploration bucket 516 and added to the non-exploration bucket 514 as the content item to serve using the user engagement model 524 for non-exploration traffic based upon a threshold number of impressions occurring for the exploration content item. Other various factors may be used to trigger the removal of the exploration content item from the exploration bucket 516 for addition to the non-exploration bucket 514 as a content item to serve using the user engagement model 524 for non-exploration traffic. In this way, exploration content items and content items may be more efficiently served to client devices in a fair manner.

Figure 6:
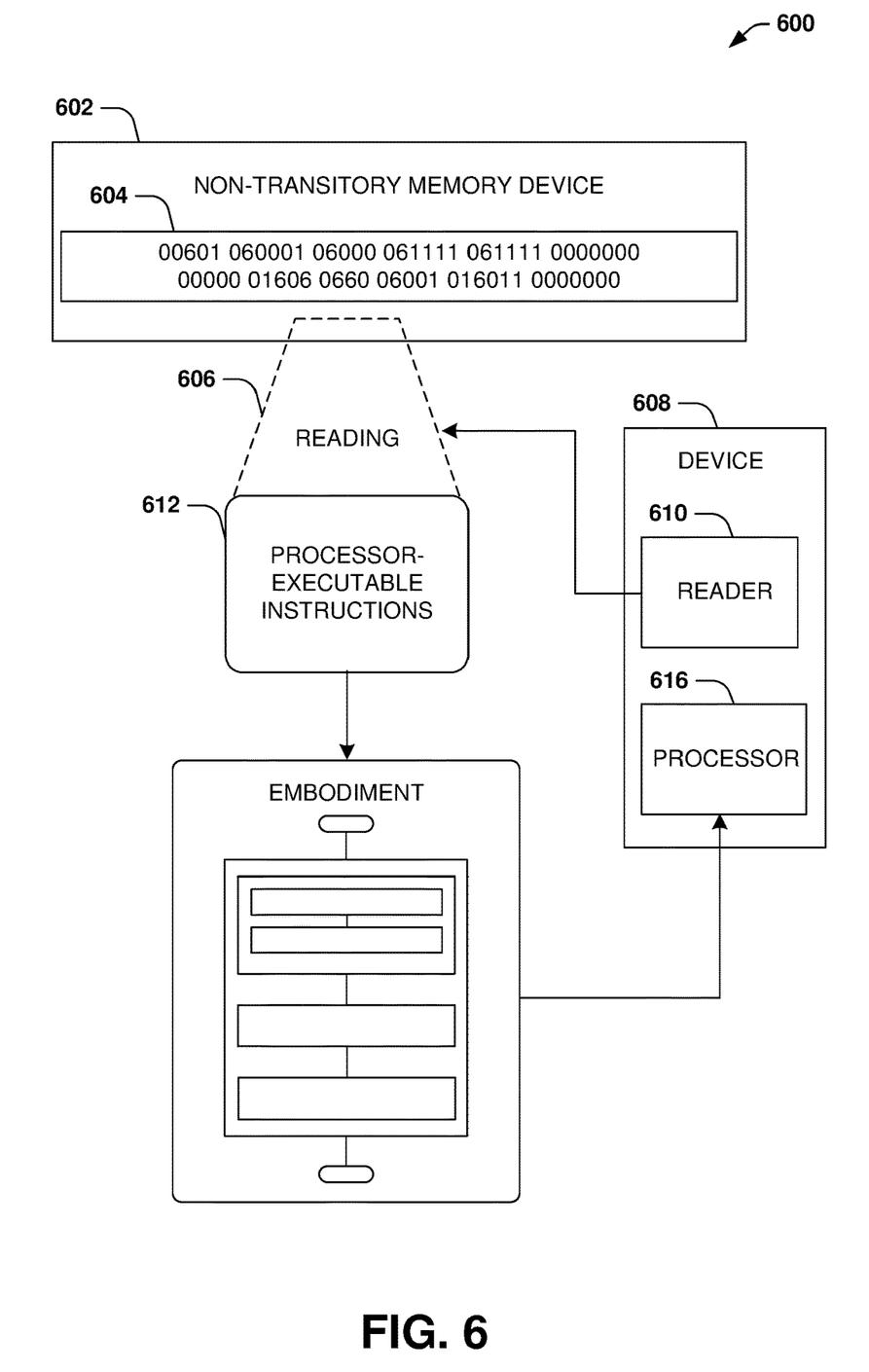
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 400 of FIG. 4, for example. In some embodiments, the processor-executable instructions 612 are configured to cause implementation of a system, such as at least some of the example system 500 of FIGS. 5A-5C, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   executing, on a processor of a computing device, instructions that cause the computing device to perform operations, the operations comprising:
   determining an amount of spend over a timespan by a content provider to provide content items of the content provider through a content serving platform to client devices of users, wherein the content items of the content provider are available for serving non-exploration traffic from client devices in a deterministic manner using a user engagement model;
   determining a number of exploration impressions of users viewing exploration content items of the content provider over the timespan, wherein the exploration content items of the content provider are available for serving exploration traffic from the client devices in a non-deterministic manner;
   determining a return on exploration impression (ROEI) metric for the content provider based upon a ratio of (i) the amount of spend to provide the content items available for serving the non-exploration traffic to (ii) the number of exploration impressions of the users viewing the exploration content items available for serving the exploration traffic; and
   utilizing the ROEI metric to rank available exploration content items of content providers for serving the exploration traffic.

2. The method of claim 1, comprising:
   determining and enforcing a maximum number of simultaneous content items of the content provider that can be maintained for serving the exploration traffic based upon the ROEI metric and a configurable base value.

3. The method of claim 1, comprising:
   determining a percentage of exploration traffic for the content provider based upon a minimum exploration percentage metric.

4. The method of claim 1, comprising:
   generating an exploration model for the content serving platform to use for selecting exploration content items to serve for the exploration traffic.

5. The method of claim 4, wherein the generating an exploration model comprises:
   utilizing the ROEI metrics to populate the exploration model with percentages of exploration traffic to serve using exploration content items of the content providers.

6. The method of claim 4, comprising:
   populating the exploration model with a first entry for a first content provider, wherein the first entry comprises a first identifier of the first content provider, a first ROEI metric for the first content provider, and a first maximum number of simultaneous exploration content items for the first content provider.

7. The method of claim 6, comprising:
   populating the exploration model with a second entry for a second content provider, wherein the second entry comprises a second identifier of the second content provider, a second ROEI metric for the second content provider, and a second maximum number of simultaneous exploration content items for the second content provider.

8. The method of claim 1, wherein the determining an amount of spend comprises:
   determining the amount of spend based upon an amount of non-exploration spend over the timespan by the content provider.

9. The method of claim 4, comprising:
   populating the exploration model with an entry for the exploration content item.

10. A computing device comprising:
    a processor; and
    memory comprising processor-executable instructions that when executed by the processor cause performance of operations, the operations comprising:
    determining an amount of spend over a timespan by a content provider to provide content items of the content provider through a content serving platform to client devices of users, wherein the content items of the content provider are used to serve non-exploration traffic;
    determining a number of exploration impressions of users viewing exploration content items of the content provider over the timespan, wherein the exploration content items of the content provider are used to serve exploration traffic;
    determining a return on exploration impression (ROEI) metric for the content provider based upon a ratio of (i) the amount of spend to provide the content items used to serve the non-exploration traffic to (ii) the number of exploration impressions of the users viewing the exploration content items used to serve the exploration traffic; and utilizing the ROEI metric to rank available exploration content items of content providers for serving the exploration traffic.

11. The computing device of claim 10, comprising:
generating an exploration model for the content serving platform to use for selecting exploration content items to serve for exploration traffic; and
periodically updating the exploration model.

12. The computing device of claim 10, comprising:
generating an exploration model for the content serving platform to use for selecting exploration content items to serve for exploration traffic.

13. The computing device of claim 12, comprising:
populating the exploration model with an entry specifying a percentage of exploration traffic for a first exploration content item.

14. The computing device of claim 13, comprising:
adjusting the percentage of exploration traffic based upon a minimum exploration percentage metric.

15. A non-transitory machine readable medium having stored thereon processor-executable instructions that when executed cause performance of operations, the operations comprising:
determining an amount of spend over a timespan by a content provider to provide content items of the content provider through a content serving platform to client devices of users, wherein the content items of the content provider are available for serving non-exploration traffic;
determining a number of exploration impressions of users viewing exploration content items of the content provider over the timespan, wherein the exploration content items of the content provider are available for serving exploration traffic;
determining a return on exploration impression (ROEI) metric corresponding to a ratio of (i) the amount of spend to provide the content items available for serving the non-exploration traffic to (ii) the number of exploration impressions of the users viewing the exploration content items available for serving the exploration traffic; and
utilizing the ROEI metric to rank available exploration content items of content providers for serving the exploration traffic.

16. The non-transitory machine readable medium of claim 15, wherein the operations comprise:
determining and enforcing a maximum number of simultaneous content items of the content provider that can be maintained based upon the ROEI metric and a configurable base value.

17. The non-transitory machine readable medium of claim 16, wherein the operations comprise:
determining the configurable base value based upon a minimum percentage metric.

18. The non-transitory machine readable medium of claim 15, wherein the operations comprise:
generating an exploration model for the content serving platform to use for selecting exploration content items to serve for the exploration traffic.

19. The non-transitory machine readable medium of claim 18, wherein the generating an exploration model comprises:
utilizing the ROEI metrics to populate the exploration model with percentages of exploration traffic to serve using exploration content items of the content providers.

20. The non-transitory machine readable medium of claim 18, wherein the operations comprise:
populating the exploration model with a first entry for a first content provider; and
populating the exploration model with a second entry for a second content provider.

* * * * *